United States Patent [19]
Wild

[11] Patent Number: 5,553,818
[45] Date of Patent: Sep. 10, 1996

[54] CONDUIT END FITTING WITH LOCK CONDITION INDICATOR

[75] Inventor: Brian J. Wild, Royal Oak, Mich.

[73] Assignee: Hi-Lex Corporation, Battle Creek, Mich.

[21] Appl. No.: 297,363

[22] Filed: Aug. 29, 1994

[51] Int. Cl.$^6$ ..................................................... F16L 5/00
[52] U.S. Cl. ........................... 248/56; 74/502.4; 248/74.2
[58] Field of Search .............................. 248/56, 27.1, 73, 248/71, 74.2, 74.3; 24/136 L, 115 M, 134 L, 132 WL; 74/502.4, 502.6

[56] References Cited

U.S. PATENT DOCUMENTS

| | | | |
|---|---|---|---|
| 3,146,010 | 8/1964 | Dellith | 248/27.1 |
| 3,868,748 | 3/1975 | Kelly | 24/115 M |
| 4,458,552 | 7/1984 | Spease et al. | 74/501 R |
| 4,640,478 | 2/1987 | Leigh-Monstevens | 248/27.1 |
| 4,763,541 | 8/1988 | Spease | 74/501 R |
| 4,903,541 | 2/1990 | Shiota | 74/501.5 R |
| 5,010,078 | 4/1991 | Kirk et al. | 74/502.4 |
| 5,236,158 | 8/1993 | Condon | 248/73 |
| 5,272,934 | 12/1993 | Chegash et al. | 248/56 |

Primary Examiner—Leslie A. Braun
Assistant Examiner—Willie Berry, Jr.
Attorney, Agent, or Firm—Young & Basile, P.C.

[57] ABSTRACT

An end fitting for attaching the conduit portion of a linear actuation cable to a fixed structure is provided with a lock condition indicator. If the end fitting is properly installed in locking engagement with the mating structure, the lock condition indicator can be latched down to lie close to the main body of the end fitting. If the end fitting is not properly installed, the lock condition indicator cannot be latched down, but instead stands out away from the main body to give a clearly visible indication of improper installation.

6 Claims, 2 Drawing Sheets

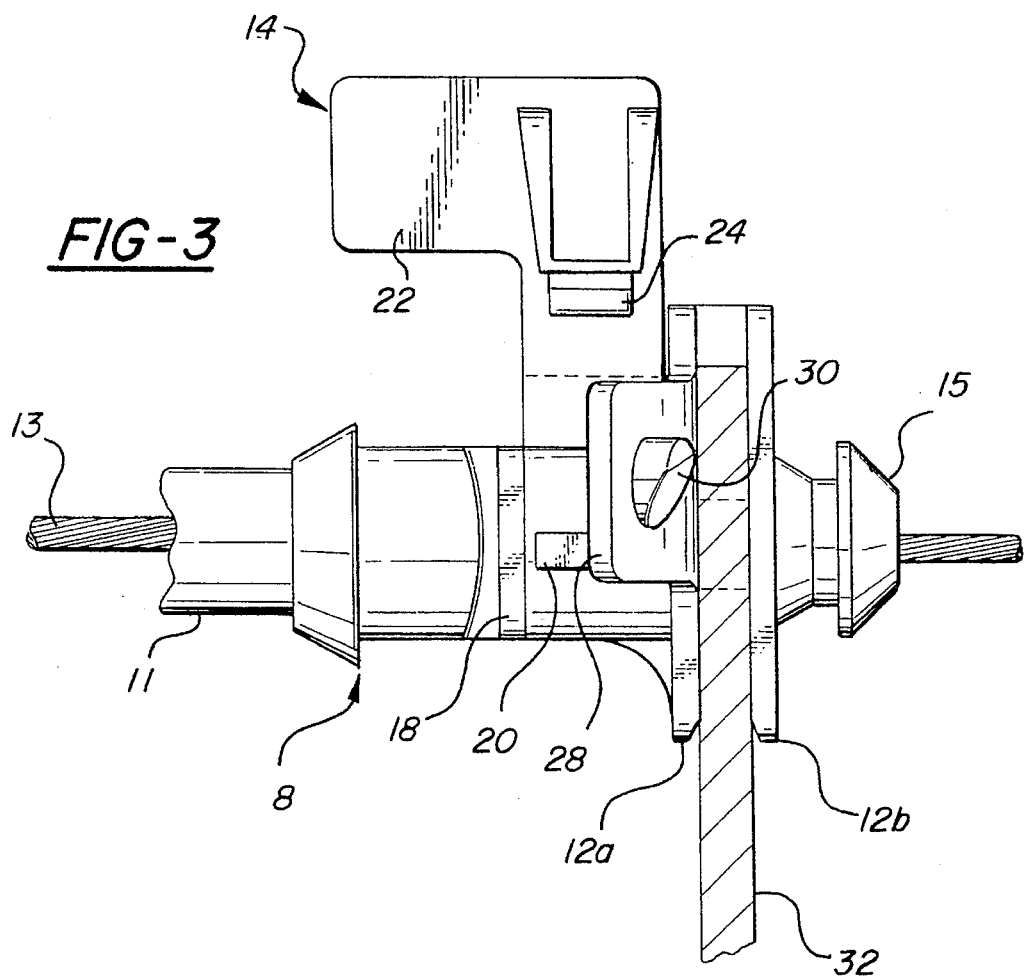
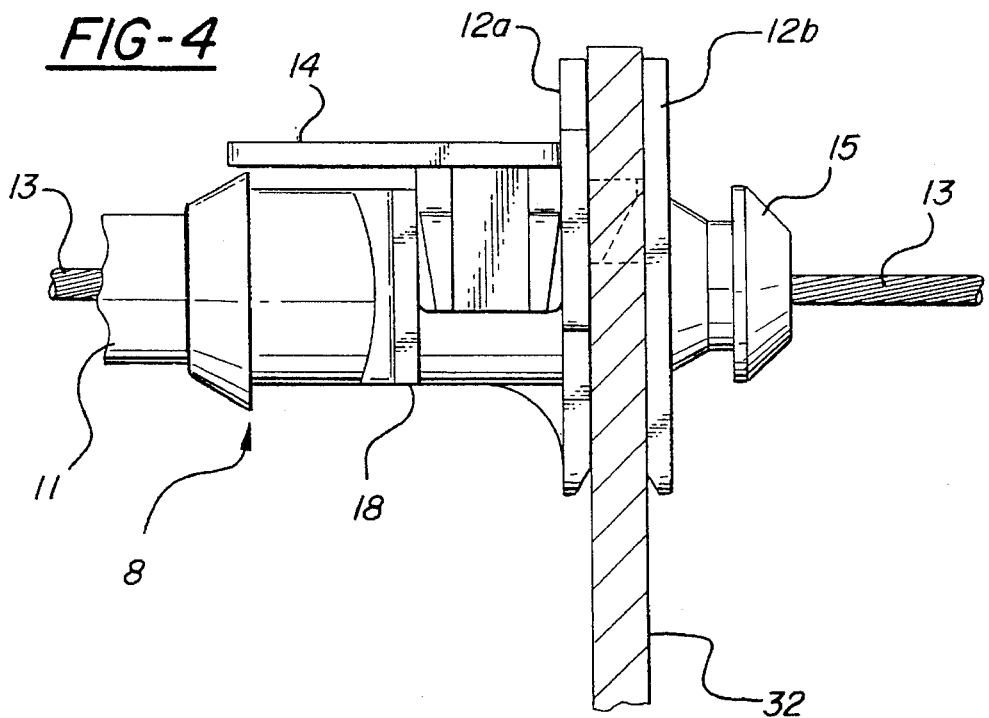

CONDUIT END FITTING WITH LOCK CONDITION INDICATOR

FIELD OF THE INVENTION

This invention relates to end fittings for attaching the conduit portion of a length of linear actuation cable to a fixed structure. The invention relates more specifically to an end fitting having a detent means to lock the fitting in position when it is properly mounted on a supporting structure and a lock condition indicator which gives a visible indication of whether or not the end fitting has achieved the proper, locked position.

BACKGROUND OF THE INVENTION

Linear actuation cables are used in many applications to transmit push/pull motion between mechanical components. These cables consist of a hollow outer sheath or conduit which surrounds an axially movable inner core wire. When both ends of the conduit are anchored to a fixed structure, a push or pull motion applied to one end of the core wire will be transmitted to the other end. The linear actuation cable will function properly even if it is very long or follows an extremely convoluted path, as long as the ends of the conduit are securely anchored in their proper positions.

End fittings have been used to anchor the conduit ends in their operative positions. Typically, such an end fitting is made of plastic and is generally tubular in shape with one end receiving and securely holding the conduit so that the core wire extends through the inside of the fitting and out the other end. A common way to anchor the end fitting in the desired installed position on the supporting structure is to provide it with a deformable detent means which interacts with a corresponding detent means on the structure. When the end fitting is placed in contact with the structure and moved toward the installed position, interference between the detent means and the structure causes the detent means to bend away from its at-rest position. When the fitting fully reaches the installed position, its detent means comes into cooperating alignment with the detent means on the structure and snaps into locking engagement therewith. If the end fitting is not pushed far enough to attain the installed position, the detent means will not snap into locking engagement with the structure, and the fitting will only be maintained in contact with the structure by friction. Consequently, the end fitting may work itself loose from the structure due to vibration during use.

In a production line environment, it is possible that the person installing the cable will not properly position the end fitting so as to achieve its locked relationship with the structure. This improper installation will not be readily apparent to a quality control inspector since there may be only a small fraction of an inch difference between the locked and unlocked positions. The lack of a distinct visual difference between the locked and unlocked positions results in a significant number of improperly installed, i.e., not lockingly engaged, end fittings going undetected, with the subsequent likelihood that the end fitting will come loose from the structure causing the linear actuation mechanism to function improperly.

BRIEF SUMMARY OF THE INVENTION

It is an object of the present invention to provide an improved end fitting for attaching the conduit portion of a length of linear actuation cable to a fixed structure.

A more specific object is to provide a cable end fitting which includes means which are indicative of whether the end fitting has achieved a locking position with respect to an associated bracket.

The invention end fitting is utilized for mounting a linear cable on a bracket wherein the end fitting, when properly mounted on the bracket, achieves a locking configuration with the bracket.

According to the invention, the end fitting further includes a lock condition indicator having a first position indicating that the locking configuration has been achieved and a second position indicating that the locking configuration has not been achieved. This arrangement provides a ready means of inspecting the end fitting to insure that the lock condition has been achieved.

According to a further feature of the invention, the end fitting includes a main body portion which surrounds the linear actuation cable; the lock condition indicator comprises a flexible flag formed as an integral lateral extension of the main body portion; and the flag in its first position is generally adjacent the main body portion and the flag in its second position extends visibly away from the main body portion. This specific arrangement allows the position of the flag relative to the main body portion of the end fitting to readily indicate the locked or unlocked disposition of the end fitting relative to the associated bracket.

According to a further feature of the invention, the flag is prevented from attaining its first position by a physical deformation of the end fitting caused when the end fitting is in contact with the bracket but has not achieved the locking configuration. This specific structural arrangement insures that the flag cannot attain the lock condition indicator position until the end fitting has achieved a locking configuration.

In the disclosed embodiment of the invention, the end fitting is adapted to be lockingly secured to a bracket plate having a U-shaped slot and the end fitting includes a tubular main body portion adapted to fit over the linear actuator; a pair of parallel flanges extending outwardly from the main body portion and axially spaced by a distance generally corresponding to the thickness of the bracket plate so that the end fitting may be mounted on the bracket plate by sliding the end fitting into the U-shaped slot to position the inboard faces of the flanges proximate opposite faces of the bracket plate and position the section of the main body portion between the flanges on the bottom of the slot; a flexible ear formed as an integral lateral extension of one of the flanges and including detent means on its inboard face for detending coaction with detent means on the bracket plate to lockingly mount the end fitting on the bracket plate in response to insertion of the end fitting completely into the slot; a latch guide extending radially outward from the main body portion at an axial distance from the outboard face on the ear; a flexible flag integral with and extending laterally outward from the main body portion and defining a latch face at its distal end having a width corresponding to said axial distance; and coacting latching means on the latch face and on the main body portion between the outboard face on the ear and the latch guide operative in response to movement of the flag to a latched position between the outboard face and the latch guide to maintain the flag in its latched position. This arrangement of a flexible ear presenting a deformed configuration precluding movement of the latch guide to its latched position unless and until the detent means on the ear moves into detending coaction with the detent means on the bracket provides a ready indication that the end fitting has achieved its locking configuration on the bracket.

BRIEF DESCRIPTION OF THE DRAWINGS

FIG. 3 is a side view of the end fitting improperly installed on the bracket plate with the ear of the fitting projecting into the path of the indicator flag so that the indicator flag cannot be latched; and FIG. 4 is a side view of the end fitting properly installed on the bracket plate with the indicator flag in its latched position.

DETAILED DESCRIPTION OF THE ILLUSTRATIVE EMBODIMENT

Figure 1:
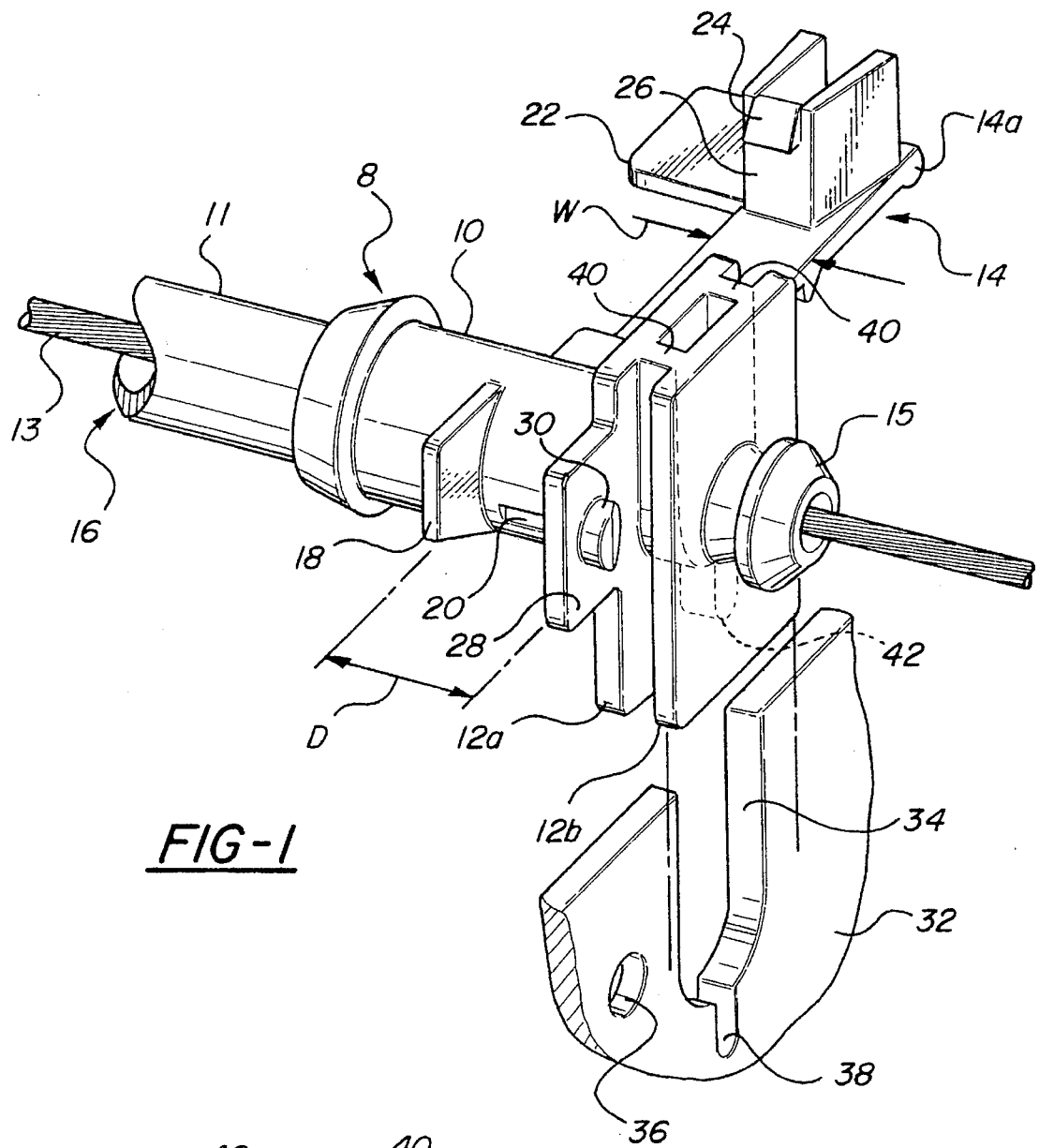
FIG. 1 is an isometric view of an end fitting according to the present invention positioned above a bracket plate on which it is about to be installed.

As seen in FIG. 1, an end fitting 8 according to the present invention is a single, integrally molded piece of a thermoplastic material, such as nylon, and comprises a generally tube-shaped main body portion 10, a pair of parallel inboard and outboard flanges 12a,12b extending radially from main body portion 10, and a locking condition indicator flag 14 flexibly attached to main body portion 10 and extending laterally outward therefrom. The inner diameter of main body portion 10 is of the proper size to snugly receive the outer conduit 11 of a linear actuator cable assembly 16 and allow the movable core wire 13 of the cable assembly to extend through the fitting and project out of the other end of the fitting. A seal retention flange 15 is formed at the end from which core wire 13 projects so that a rubber seal (not shown) may be snapped over the end to help prevent dirt or other debris from entering the fitting and interfering with motion of wire 13.

FIG. 1 also shows a bracket plate 32 adapted to receive and lockingly engage end fitting 8. A U-shaped slot 34 is cut or otherwise formed in the edge of bracket plate 32 and has a width slightly greater than the diameter of fitting main body portion 10. A detent hole 36 is located laterally adjacent slot 34 and an alignment notch 38 extends farther down into plate 32 at the bottom of slot 34.

To mount end fitting 8 in bracket plate 32, end fitting 8 is pushed down into slot 34 so that the portion of bracket plate 32 adjacent slot 34 is trapped between flanges 12a,12b and the section of main body portion 10 between flanges 12a, 12b lies in the bottom of slot 34. Detent hole 36 and alignment notch 38 are engaged by portions of end fitting 8 in a fashion to be described below.

A latch guide 18 extends radially outward from main body portion 10 and an axially running notch 20 is formed in the surface of main body portion 10 between latch guide 18 and flange 12a. Locking condition indicator flag 14 is connected to main body portion 10 by a hinge section 9 of reduced thickness at a position approximately diametrically opposite notch 20 and has a maximum width W generally equal to the distance D between latch guide 18 and flange 12. The distal end 14a of indicator flag 14 is enlarged to provide a latch face 26 from which a ridge 24 projects. Also located at the distal end of indicator flag 14 is a latch tab 22 which provides an enlarged area for the installer to grip when manipulating the latch. Indicator flag 14 is of a length such that when it is wrapped around the circumference of main body portion 10 (in a counterclock-wise direction as seen in FIG. 2) ridge 24 will snap into latching engagement with notch 20 thereby holding indicator flag 14 against main body portion 10.

Figure 2:
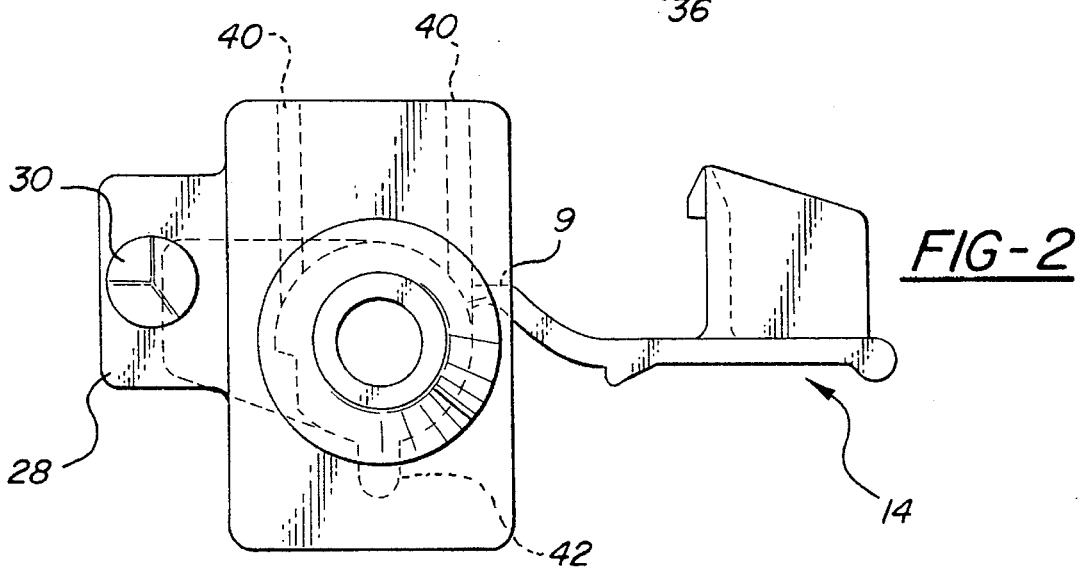
FIG. 2 is an end view of the end fitting with an indicator flag formed as a part of the fitting in the extended, unlatched position.

As can be seen in FIGS. 1 and 2, the section of main body portion 10 lying between flanges 12a,12b is molded with two tangential extensions 40 and a radially projecting alignment nub 42. These features, by matching the interior shape of slot 34 and alignment notch 38, ensure that end fitting 8 can only be inserted into slot 34 in the proper orientation.

Inboard flange 12a has an integrally molded ear 28 extending radially outwardly from the main body portion of the flange in angular alignment with latch guide 18. A detent knob or bump 30 projects axially from the outboard surface of ear 28. Flanges 12 are separated by a distance only slightly greater than the thickness of bracket plate 32 so that when end fitting 8 is pushed down into slot 34, physical interference between detent bump 30 and bracket plate 32 causes ear 28 to bend away from bracket plate 32 as shown in FIG. 3. When end fitting 8 is fully seated in slot 34, detent bump 30 comes into alignment with detent hole 36 and snaps into locking engagement therewith. In this configuration end fitting 8 is locked into its operative position on bracket plate 32 and can only be removed therefrom by first bending ear 28 away from bracket plate 32 so as to disengage detent bump 30 from detent hole 36.

When end fitting 8 has achieved the locked position on bracket plate 32, indicator flag 14 can be wrapped around the circumference of main body portion 10 until ridge 24 snaps into engagement with notch 20 to hold indicator flag 14 closely adjacent to main body portion 10, as shown in FIG. 4. If end fitting 8 has been improperly mounted on bracket plate 32 so that detent bump 30 is not in engagement with detent hole 36, ear 28 is held in a deformed position due to the interference between detent bump 30 and the surface of bracket plate 32. In this deformed condition, the distance D between latch guide 18 and ear 28 is less than the width W of indicator flag 14 so that indicator flag 14 can not be moved to the position in which ridge 24 comes into latching engagement with notch 20. If indicator flag 14 cannot achieve the latched condition it will instead maintain its original molded position in which it extends visibly away from main body portion 10, thereby giving a clear visual indication to an installer or a quality control inspector that end fitting 8 is not properly installed on bracket plate 32.

Indicator flag 14 may be made even more visible when in its extended position by adding an area of contrasting color to latch tab 22.

It will be appreciated that the drawings and description contained herein are merely meant to illustrate a particular embodiment of the present invention and are not meant to be limitations upon the practice thereof as numerous variations will occur to skilled persons.

I claim:

1. An end fitting mounting a linear actuation cable on a bracket wherein the end fitting includes a main body portion which surrounds the linear actuation cable and locking means integral with the main body portion and operative in coaction with the bracket to enable the end fitting when properly mounted on the bracket to achieve a locking configuration with the bracket, characterized in that:

the end fitting further includes a lock condition indicator integral with the main body portion, separate from and operable independently of the locking means, and articulated with respect to the main body portion for movement between a first position indicating that the locking configuration has been achieved and a second position indicating that the locking configuration has not been achieved.

2. An end fitting according to claim 1 wherein:

the locking condition indicator comprises a flexible flag formed as an integral lateral extension of the main body portion; and the flag in its first position is generally adjacent the main body portion and the flag in its second position extends visibly away from the main body portion.

3. An end fitting adapted to receive a linear actuation cable and adapted to be lockingly secured to a bracket plate having a U-shaped slot opening in an edge thereof, the end fitting comprising:

a tubular main body portion adapted to fit over the linear actuator;

a pair of parallel flanges extending outwardly from the main body portion and axially spaced by a distance generally corresponding to the thickness of the bracket plate so that the end fitting may be mounted on the bracket plate by sliding the end fitting into the U-shaped slot to position inboard faces of the flanges proximate opposite faces of the bracket plate and position the section of the main body portion between the flanges on the bottom of the slot;

a flexible ear formed as an integral lateral extension of one of said flanges and including detent means on its inboard face for detenting coaction with detent means on the bracket plate to lockingly mount the end fitting on the bracket plate in response to insertion of the end fitting completely into the slot;

a latch guide extending radially outward from the main body portion at an axial distance from the outboard face of said ear;

a flexible flag integral with and extending laterally outward from said main body portion and defining a latch face at its distal end having a width corresponding to said axial distance; and coacting latching means on said latch face and on said main body portion between said outboard face of said ear and said latch guide, said coacting latching means operating in response to movement of said flag to a latched position between said outboard face and said latch guide to maintain the flag in its latched position.

4. An end fitting according to claim 3 wherein:

the detent means on said ear comprises a male configuration; and the detent means on the bracket plate comprises a female configuration complementary to the male configuration on said ear.

5. An end fitting according to claim 3 wherein:

said flexible flag extends laterally outwardly from said main body portion at a location approximately diametrically opposite said latch guide.

6. An end fitting for mounting a linear actuation cable on a bracket wherein the end fitting when properly mounted on the bracket achieves a locking configuration with the bracket, characterized in that:

the end fitting further includes a lock condition indicator having a first position indicating that the locking configuration has been achieved and a second position indicating that the locking configuration has not been achieved;

the end fitting includes a main body portion which surrounds the linear actuation cable;

the locking condition indicator comprises a flexible flag formed as an integral lateral extension of the main body portion;

the flag in its first position is generally adjacent the main body portion and the flag in its second position extends visibly away from the main body portion; and the flag is prevented from attaining its first position by a physical deformation of the end fitting caused when the end fitting is in contact with the bracket but has not achieved the locking configuration.

* * * * *